US006438236B1

(12) United States Patent
Best et al.

(10) Patent No.: US 6,438,236 B1
(45) Date of Patent: Aug. 20, 2002

(54) AUDIO SIGNAL IDENTIFICATION USING DIGITAL LABELLING SIGNALS

(75) Inventors: Stuart John Best, Harlington; Martin Peter Todd, Uxbridge; Timothy Poole, Oldfield Park; Ian Robert McLauchlan, Twyford, all of (GB)

(73) Assignee: Central Research Laboratories Limited, Middlesex (GB)

( * ) Notice: Subject to any disclaimer, the term of this patent is extended or adjusted under 35 U.S.C. 154(b) by 0 days.

(21) Appl. No.: 08/860,659

(22) PCT Filed: Dec. 22, 1995

(86) PCT No.: PCT/GB95/03035

§ 371 (c)(1),
(2), (4) Date: Jun. 23, 1998

(87) PCT Pub. No.: WO96/21290

PCT Pub. Date: Jul. 11, 1996

(30) Foreign Application Priority Data

Jan. 7, 1995 (GB) .......................................... 9500285

(51) Int. Cl.[7] .......................... H04H 5/00; G06F 15/00; G10L 21/00

(52) U.S. Cl. ......................... 381/2; 704/200.1; 704/225

(58) Field of Search ........................... 381/2; 704/200.1, 704/225

(56) References Cited

U.S. PATENT DOCUMENTS

| | | | | | |
|---|---|---|---|---|---|
| 4,876,617 | A | * | 10/1989 | Best et al. | 360/60 |
| 5,341,457 | A | * | 8/1994 | Hall, II et al. | 395/2.31 |
| 5,579,404 | A | * | 11/1996 | Fielder et al. | 381/106 |
| 5,600,756 | A | * | 2/1997 | Ely | 395/2.44 |
| 5,638,451 | A | * | 6/1997 | Sedlmeyer | 381/2 |
| 6,338,037 | B1 | * | 1/2002 | Todd et al. | 704/500 |

FOREIGN PATENT DOCUMENTS

| | | | |
|---|---|---|---|
| EP | 0 245 037 A2 | | 4/1987 |
| EP | 0366381 A2 | * | 2/1990 |

* cited by examiner

*Primary Examiner*—Forester W. Isen
*Assistant Examiner*—Laura A. Grier
(74) *Attorney, Agent, or Firm*—Crowell & Moring LLP

(57) ABSTRACT

Apparatus for labelling a stereophonic signal includes a plurality of notch filters having selected center frequencies to form notches at the selected frequencies in the channels of a stereophonic audio signal. Code generating components produce a coded label signal in the form of one or more code words, with the code being formed of selected signal bursts at the selected frequencies. The coded label signals are inserted into both channels of the audio signal, in the notches formed by the notch filters. The code signal amplitude bears a predetermined relationship to the audio signal amplitude in each channel.

13 Claims, 6 Drawing Sheets

AUDIO SIGNAL IDENTIFICATION USING DIGITAL LABELLING SIGNALS

FIELD OF THE INVENTION

The present invention relates to the labeling of audio signals to enable subsequent identification.

The present invention is particularly, but not solely, applicable to the labeling of audio and/or video sound track recordings such as to indicate the origins of the recordings, or the owner of the copyright in the recordings, or both. The labeling may also provide information as to payment of copyright royalties due.

BACKGROUND ART

European patent document EP-B-0245037 discloses and claims apparatus for the labelling of an audio signal, the apparatus comprising a plurality of filters to eliminate a plurality of specified frequency ranges from a given audio signal to form respective notches therein having respective center frequencies; code generating means to produce a code signal including an identifying portion and a message portion, the message portion formed of a plurality of bits, a first value of bits represented by a burst of a first respective specified frequency and a further value of bits being represented by a burst of a further respective specified frequency different from the first respective specified frequency, the specified frequencies selected to correspond to the respective center frequencies of the notches, combining means to sum the code signal with the audio signal containing notches; monitoring means to monitor the amplitude of the given audio signal; modulating means to set the code signal amplitude at a specified level below the given audio signal amplitude so that the code signal amplitude varies with the given audio signal amplitude; the apparatus characterized in the identifying portion of the code signal comprises a burst of both specified frequencies simultaneously and the apparatus further comprises frequency monitoring means to monitor the frequencies present in the given audio signal; and interrupting means to prevent the elimination of the plurality of specified frequency ranges and also prevent insertion of the code signal when the frequencies present in the given audio signal lie substantially outside a first given frequency range.

In earlier systems incorporating this apparatus, the code signal provided a label for the audio signal and usually consisted of two digital words, each word including an initial identifying portion of eight bits length comprising a burst of both frequencies. A data portion then followed comprising bursts of either the first or the second frequency to represent a “1” bit or a “0” bit. Two digital words were found necessary on account of the amount of data to be inserted to represent the International Standard Recording Code (ISRC). For stereophonic signals, the channel in which the code was inserted was changed from left to right alternately, so as to reduce the risk of detection of a code word by a listener to the program material.

Whilst the above system works perfectly well in practice, there is one specific application in which further improvement is desired. In this specific application, the labelled stereophonic channels are combined to give a monophonic signal before decoding (this is so that the same decoding apparatus can be used for both monophonic and stereo signals). In such an application, it becomes difficult to retrieve the coded signal, because the coded signal is normally inserted at an intensity related to the intensity of the program material in that particular channel. Thus with a combined signal, the coded signal will not necessarily be related to the intensity of the combined signal; thus it is more difficult to know at what level to expect to find the coded signal and this increases the difficulty of recovering the code. In addition, the code will be lost if only one channel of the stereophonic signal is received.

SUMMARY OF THE INVENTION

It has now been realized, in accordance with the invention, that it is not necessary to insert the code as code words introduced alternately in the two channels in order to prevent detection by a listener. In accordance with the invention, an entire coded label may be inserted into one channel without impairment of the audio signal.

Accordingly, the present invention provides in a first aspect apparatus for the labelling of a stereophonic audio signal, the apparatus comprising a plurality of notch filters having selected center frequencies to form notches at such selected frequencies in the channels of a stereophonic audio signal, code generating means to procure a coded label signal formed as one or more code words, the code being formed of selected signal bursts at the selected frequencies, and insertion means for inserting the coded label signal into both channels of the audio signal in said notches therein, with the code signal amplitude bearing a predetermined relationship to the audio signal amplitude of the respective channel.

Thus in accordance with this first aspect of the invention, since the entire label may be inserted into each channel of the stereophonic signal at a level related to the intensity/amplitude of the level of the audio signal, when the decoding operation takes place and the stereophonic channels are combined to give a monophonic signal, the coded signal will remain at a level related in a predetermined manner to the audio signal; thus the detection and decoding of the code label is facilitated.

Thus the present invention gives the advantage of better monophonic compatibility, as when the signal are combined to give a monophonic signal the level of the inserted code will track with the level of the monophonic signal. In addition the simultaneous labelling in a plurality of channels enables a reduction in the required amplitude of the coding signal in any given channel, which can further reduce audibility of the code. The invention also gives an unexpected benefit. In previous methods, the apparent position of the sound source of the code is always at one or other of the stereo loudspeakers, whereas in the present invention the code signal has an apparent position which coincides with the loudest program source for stereo signals, and this can move between the loudspeakers and is generally not in a fixed position. This can make the code even more difficult for a listener to detect in normal listening.

In a further aspect, the present invention provides apparatus for the labelling of an audio signal, the apparatus comprising a plurality of notch filters having selected center frequencies to form respective notches at such selected frequencies in stereophonic audio signal, code generating means to produce a coded label signal comprising one or more code words, the code being formed of selected bursts of the selected frequencies, and including insertion means for inserting at least part of the entire coded label signal simultaneously into each channel of the stereophonic audio signal in said notches therein.

The insertion means preferably includes means for detecting the intensity level of the audio signal at the frequencies at which the code label is to be inserted, and for preventing code insertion when the intensity of the audio signal is not sufficient to mask the code. In one preferred embodiment, the insertion means preferably includes means for assessing whether the residual audio signal remaining at the notch frequencies will interfere with code detection. In another preferred embodiment, a check is made prior to transmitting the coded audio signal on the code inserted at the notch frequencies, to assess whether the code can be decoded. This is preferably done by decoding the inserted code bit-by-bit prior to transmission.

In accordance with the invention, the label signal may comprise one or more data words. In situations where an ISRC code is to be inserted, two data words will usually be employed since one very long word carrying all the required information would increase the risk of detection by a listener. However in some applications where not so much data is required, a single code word may be sufficient.

A code word usually consists, as disclosed in European patent document EP-B-0245037 of an initial identifying portion comprising simultaneous bursts of both signal frequencies, followed by a message portion comprising bursts of either one frequency. In accordance with the invention, it has been found that an initial synchronizing portion is improved by providing it as a series of narrow pulses of predetermined width and spacing, within certain allowable deviations. The pulses can be used to derive a clock, which provides the starting point of the data, and the distance between data bits. This provides a significantly more complex signal requirement for the identification of the code, thereby reducing the likelihood of false data recovery and a significantly better signal from which to extract the data clock while minimizing the effects of noise on individual timing edges.

As preferred two notch frequencies are employed, with the notch frequency accurate to 1 Hz. The filters in one embodiment are 50 dB deep and 150 Hz wide at the 3 dB point. It will be understood for the purposes of this specification, that although a notch filter rejects a band of frequencies, this is so small in relation to the entire audio bandwidth that the filter can be represented by specifying a single frequency at the midpoint of the range.

BRIEF DESCRIPTION OF THE DRAWINGS

Preferred embodiments of the invention will now be described with reference to the accompanying drawings in which.

DESCRIPTION OF THE PREFERRED EMBODIMENTS

Figures 1A, 1B:
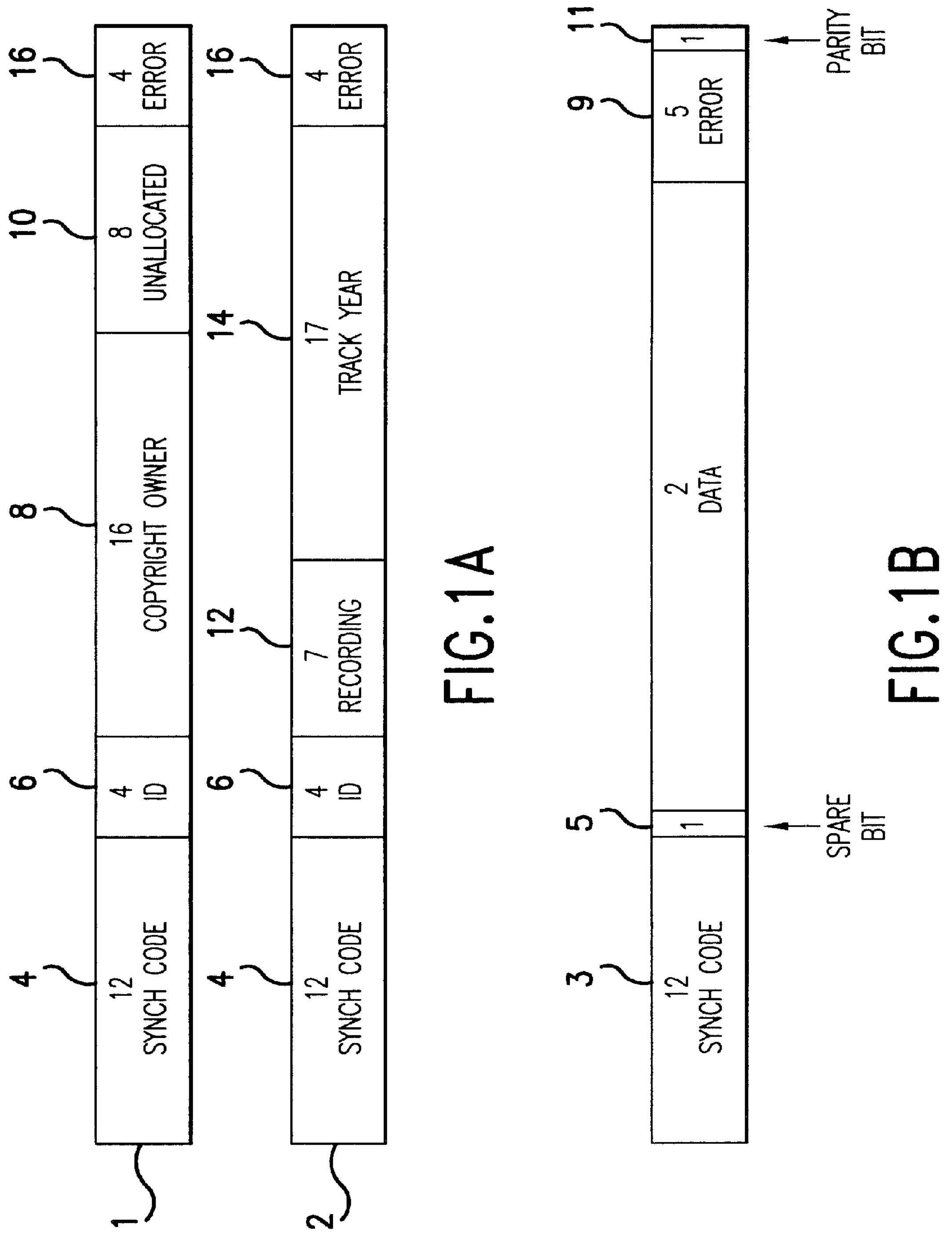
FIG. 1 shows examples of formats of a code label for inserting into audio signals.

FIG. 1A shows the format of one example of a code label for inserting into an audio signal. The label is divided into two words 1, 2. Each word comprises an initial twelve bits 4 comprising a synchronization code, followed by a 4 bit identifier 6. Two bits of this identify which of the two codes words are to follow. The first word 1 contains a section 8 identifying the owner of the copyright material and a section 10 containing unallocated bits (it may be desired to add a country code). The second word 2 includes sections 12, 14 identifying the recording and track, and the year of issue. The final four bits 16 of each word comprise an error correction code.

The code words last approximately 1.1 seconds each. Between each word is a gap of approximately 1.1 seconds. Hence a complete code cycle in this example is inserted every 4.4 seconds at best. In practice, since code is only inserted when there is sufficient music to mask it the actual code rate could be less than this. In the case of certain types of music (e.g., solo instruments) the code may only be inserted a few times over a period of a minute or two. This is considered acceptable since the overriding criterion is that the code shall not be heard.

For ISRC applications the data may be in the form of ASCII code. However the code format permits the information being carried as digital numbers rather than alphanumeric characters. This is desirable to keep the amount of inserted data as small as possible so that only a single code word is needed. The digital code numbers may be converted into actual names if necessary by the use of a lookup table/database. An example of a single code word format is shown in FIG. 1B. The word comprises an initial section 3 comprising a twelve bit synchronization code, a spare bit 5, a 25 bit section 7 for data, a five bit section 9 for error correction, and a single parity bit 11. The 25 bit data section provides for a great deal of flexibility in assigning code numbers. The period of a complete code cycle is about 2.2 seconds.

Figure 2:
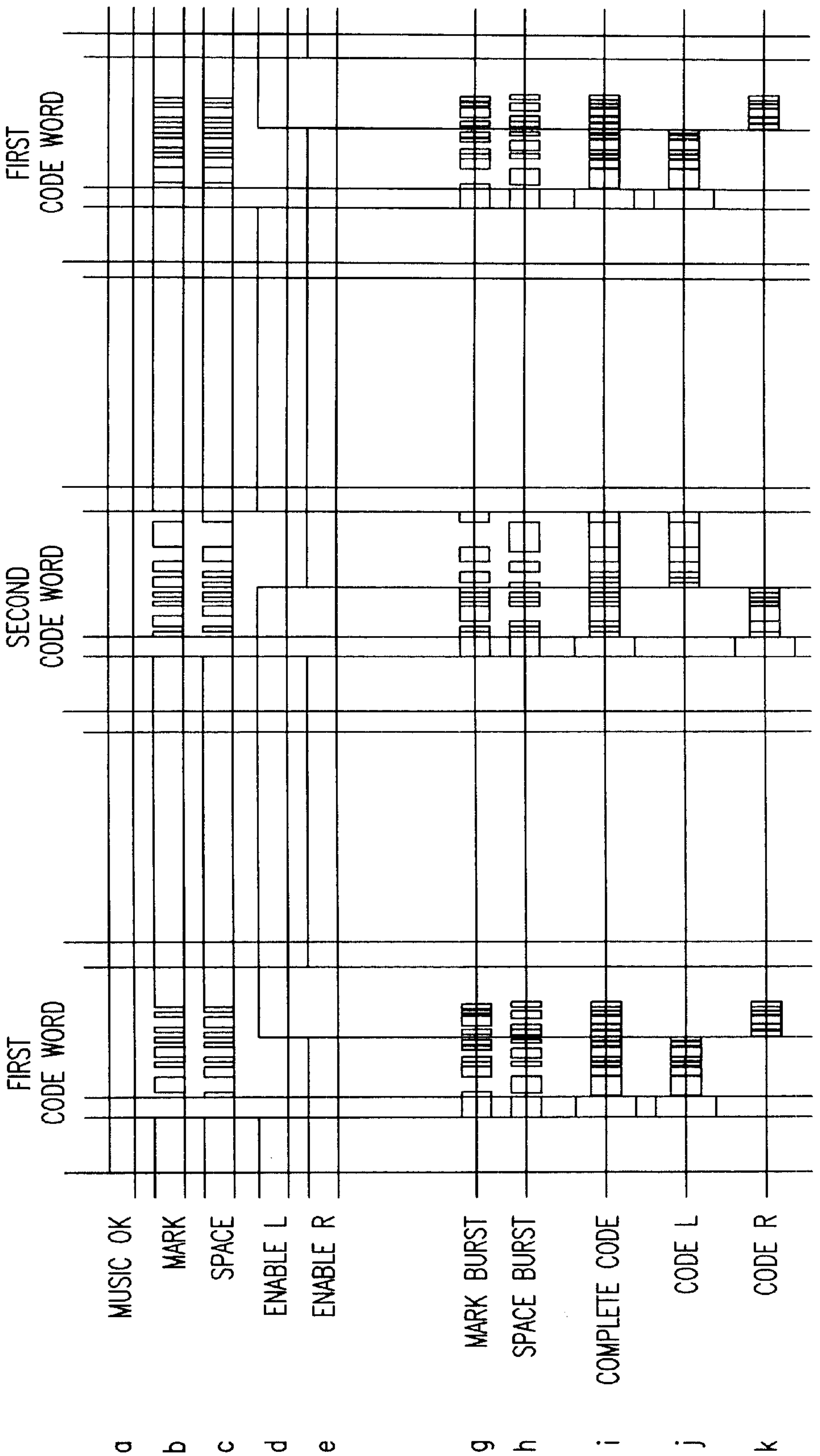
FIG. 2 is a wave form diagram of a prior art system for inserting coded labels into audio signals.

Referring now to the prior art system of FIG. 2, each stereo channel was treated as a separate channel for coding purposes. When encoding, the data sequence was distributed between the two channels. The two words were split into two halves and these halves were inserted alternately into the left and right channels. The intensity level of code insertion for each channel was determined only from the channel in question. In the event that the signal was converted to mono it was impossible to recover the level information needed to extract the data since, as a consequence of the change to mono, each channel interfered with the other. Referring to FIG. 2, waveform a is an enabling signal for an audio signal to be encoded, waveform b is the waveform envelope for the frequency bursts at the first notch frequency representing mark bits, waveform c is a similar diagram for the second notch frequency representing space bits, and waveforms d and e are enable signals for mixing the code signals with the respective left and right audio signal channels.

Waveforms g and h represent first and second frequency bursts according to the envelopes b,c, and waveform i represents the complete code burst forming the code word, that is a combination of g and h. Waveforms j, k show how the code word is transmitted as two halves on alternate left and right audio channels according to the enable waveforms d,e.

Figure 3:
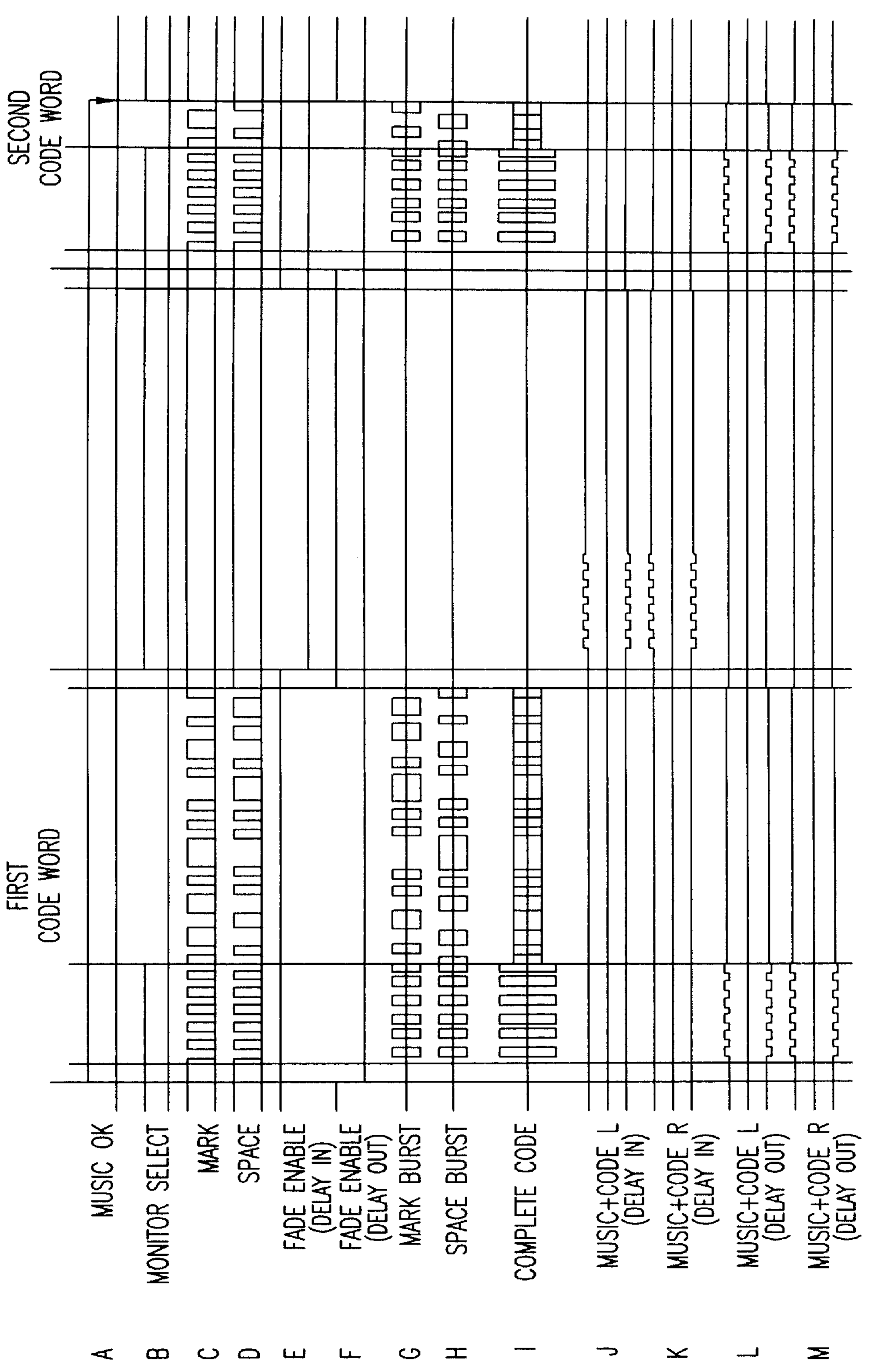
FIG. 3 is a wave form diagram of label codes inserted into an audio signal in accordance with the invention.

In a preferred embodiment of the invention, the waveforms appear as shown in FIG. 3. An identical data pattern is inserted simultaneously into both channels, but the amplitude of data in each channel is directly proportional to the relative levels of each channel. In this way, if the two channels are combined to mono the resulting level of inserted data and music are compatible and the code is recoverable. An unanticipated benefit of this scheme is that the relative position of the code between a pair of stereo speakers (if the code could be heard) will tend to coincide with the position of the loudest part of the program. Also the code in each channel is 6 dB lower than that for the scheme of FIG. 2, since in the decoding operation the code signals are summed.

Referring to FIG. 3, waveform A is an enablement signal for code generation, waveform B is a signal to be explained below for monitoring the amplitude level at which to insert code, waveforms C and D represent the data envelopes for modulating frequency generators to produce respective mark and space codes, waveforms E and F are enabling signals for coded output signals, with or without delays introduced, waveforms G and H represent the output from frequency generators modulated according to the waveforms C, D, and waveform I represents a complete code word, being the sum of waveforms G,H. Waveforms J and K represent the total amplitude of the left and right channels with the code labels inserted, and waveforms L and M represent the same total amplitudes but with a delay removed.

Referring to waveform I, it may be seen the initial synchronizing portion of the code word is comprised of twelve bits with six bursts, each 23 milliseconds long, of both frequencies. As compared with a simple continuous identifying portion of FIG. 2, the scheme of FIG. 3 improves the extraction of genuine code words, and makes the extraction of false codes less likely.

Figure 4:
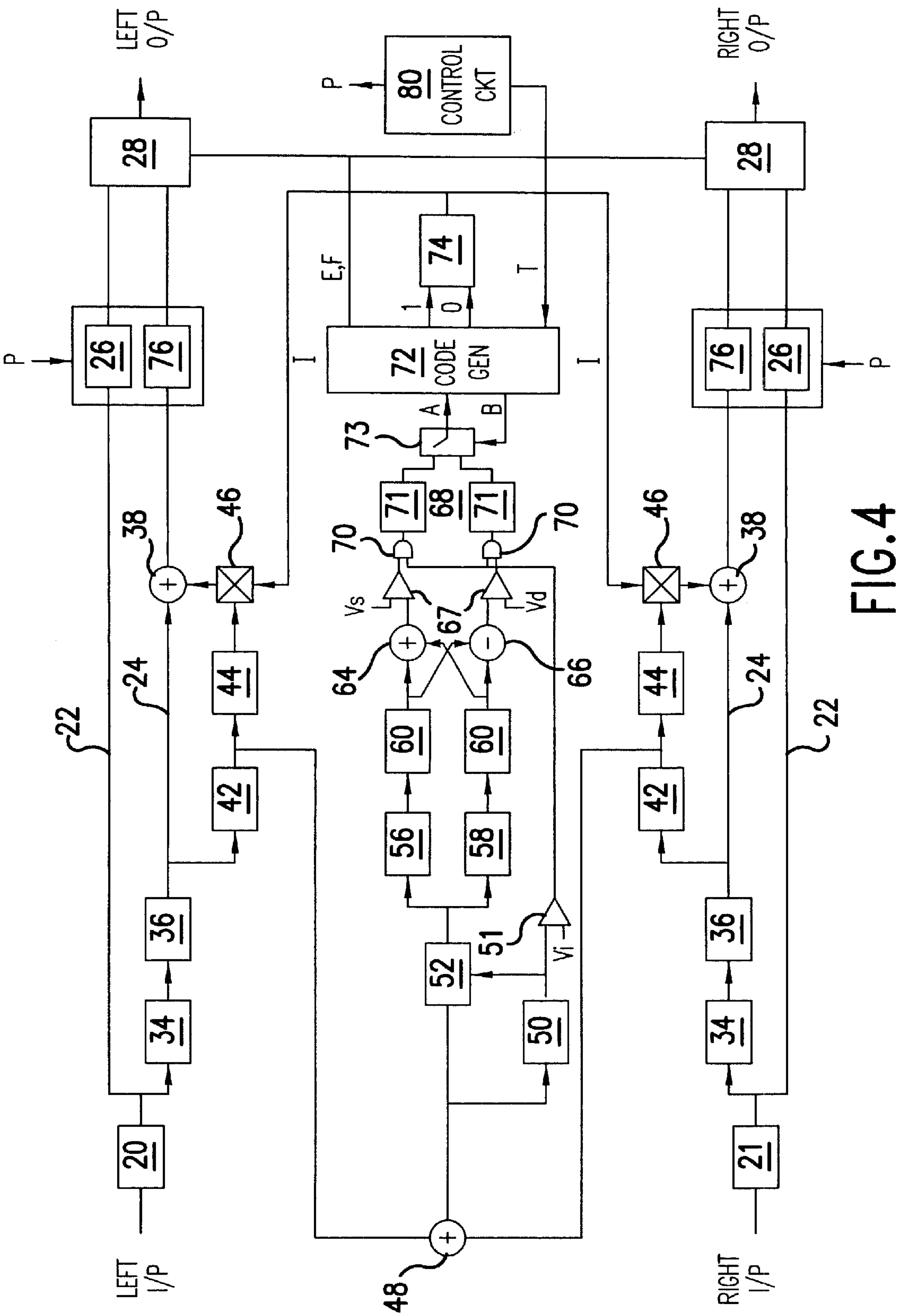
FIG. 4 shows an encoding apparatus forming a first preferred embodiment of the invention.

The encoding apparatus used in the above method will now be described in more detail. FIG. 4 shows a block diagram of a first preferred embodiment of the encoding apparatus according to the invention. The encoder has interfaces 20, 21 so that either analogue or digital stereo signals may be labelled. The choice of working in the analogue or digital domain is selected via a switch selector (not shown). The interfaces permit a range of input data rates while maintaining an internal data rate of 44.1 kHz. When operating totally in the digital domain, the encoding apparatus receives the digital output and word synchronization pulses from, for example, a Sony PCM 1610/30 digital audio recording machine, and supplies a digital input and word synchronization back to a similar instrument. It is possible to provide in addition ADC and DAC conversion plus anti-aliasing filters if it is required to input and output an analogue signal whilst performing encoding in the digital domain.

Interfaces 20, 21 provide (L) and right (R) channel digitized stereophonic signals, each to a respective direct signal path 22 and a coding signal path 24. Direct paths 22 go direct via a respective delay element 26 and a cross-fader 28 to left and right channel outputs.

The coding paths 24 for the left and right channel signals each includes notch filters 34, 36 for removing two specified notch frequencies, e.g. 3.0 and 3.5 kHz from the audio signal. Each filter has a defined frequency accurate at its mid point to within 1 Hertz, and a width at the 3 dB attenuation point of 150 Hertz. The notch filters have a 50 dB deep notch and comprise 8th order elliptic IIR filters.

The notched audio signals are fed to summing devices 38, and to an arrangement for determining the level at which the code is inserted into each channel when insertion is enabled, and whether the program content will result in breakthrough resulting in code recovery errors. Thus the arrangement determines whether the level in either channel is sufficient to mask the code signal, tests for program breakthrough and consequent decode errors, and inhibits the insertion of the codes into the signals when the program breakthrough is sufficient to cause significant decode errors. Each of the left and right notched signals passes through a wide bandpass masking filter 42 which removes frequencies which lie outside the range 1 to 5 kHz. The filtered signals are rectified as at 44, and the rectified signal is fed to a signal multiplier 46.

A summer 48 is provided for summing the signals from masking filters 42. The summed signal is rectified as at 50 and the rectified signal is employed both to control an automatic gain control circuit 52, and as an insertion level control, to be described. AGC circuit 52 provides an output to two bandpass filters 56, 58 in parallel signal paths, filter 56 being a narrow bandpass filter having a center frequency of 3.0 kHz, a width of approximately 150 Hz at the 10% pass level and an attenuation out of band of approximately 50 dB, thus corresponding to the inverse of notch filter 34. Filter 58 is a narrow pass band filter which has a center frequency of 3.5 kHz but which is otherwise identical to filter 56, filter 58 therefore corresponding to the inverse of notch filter 36. The output signals from filters 56,58 are rectified in rectifiers 60, and the sum and difference between these two rectified signals are derived in summer 64 and subtractor 66. The sum and difference signals are compared with respective threshold valves Vs and Vd in comparator 67, the outputs of the comparator 67 providing inputs to level control gating circuit 68. Level control circuit 68 comprises two AND gates 70 which have as inputs the signals from comparator 67 and an input from comparator 51; this compares rectified signal from rectifier 50 with a preset value Vi to assess whether the audio content of the signal is sufficient to adequately mask the code signals. The outputs of gates 70 are smoothed as at 71 and passed to a two way switch 73, which provides a MUSIC OK signal A (FIG. 3) to a code generator 72.

Code generator 72 is enabled by an output control signal T from a controller circuit 80 to provide mark/space control signals 1, 0 to a sine wave generator 74 in order to generate code label signals G, H, I (FIG. 3). Circuit 72 provides enabling signals E, F to cross faders 28, and a breakthrough select signal B (FIG. 3) to control the state of switch 73. The code label signal 1 is multiplied in multipliers 46 by the rectified values of the audio signals to adjust the level of the code label signals to bear a predetermined relationship to i.e. a specified level below, the current value of the audio signal. The outputs of multipliers 46 are added to the audio signal at summers 38, and the resultant is fed via delay circuit 76 to cross-fader circuits 28.

Controller circuit 80 provides appropriate timing signals to the other elements of the circuit, in particular control signal T to code generator circuit 72, and delay control signals P to delays 26, 76.

Thus, in operation, audio signals are supplied to the interfaces 20, 21 of the circuit. A band passed, summed and gain controlled version of the L and R signals are applied to bandpass filters 56, 58. These pass the residual content of the audio signals at the notch frequencies and the rectified values are summed and subtracted as at 64, 66. These values are compared with threshold values Vs and Vd in comparators 67, and the results are applied to AND gates 70 together with the output from comparator 51, which compares the intensity of the summed audio signals with threshold value Vi.

Thus level checker circuit 68 will pass a MUSIC OK signal A to code generator 72 if comparator 51 generates a signal indicating that the overall audio signal is sufficient to mask the code, and if comparator 67 pass signals indicating that the residual amount of audio signal present after filtering at the notch frequencies will not result in interference with code detection.

It will be appreciated that in code detection, the sum of the code signals at the notch frequencies is monitored during the synchronization phase, and accordingly the sum of the residual audio signals at the notch frequencies may interfere with code detection. Thus during code generation of the synchronization pulses, waveform B actuates switch 73 so that the signal from summer circuit 64 is monitored by generator 72. Similarly it will be appreciated that in code detection, the difference between the code signals at the notch frequencies is monitored during the data phase, and accordingly the difference of the residual audio signals may create interference. Thus during code generation of the data pulses, waveform B switches switch 73 so that the signal A from subtraction circuit 66 is monitored.

As shown by way of example in FIG. 3 waveform A enables code generation for the duration of a first code word, but drops to a disabling level partway through a second codeword, indicating that the signal from subtractor 66 is excessive at that time instant.

Code generation is enabled by waveforms T from circuit 80, and generated code is applied as waveform 1 via level controlling multipliers 46 to summers 38 where it is added to the audio signals L and R; the entire code label is added simultaneously to both channels. In addition, cross-faders 28 are enabled by waveforms E, F to pass the coded audio paths. At the end of the code insertion phase, faders 28 provide a smooth transition back to the encoded audio signal paths 22. The resultant waveforms at the output of faders 28 are shown in waveforms J, K of FIG. 3. In the event that delays provided by delays 26, 76 are not required for certain video applications, an appropriate control signal P is generated by timer circuit 80, to disable the delays and provide the waveforms indicated at L, M in FIG. 3.

Figure 5:
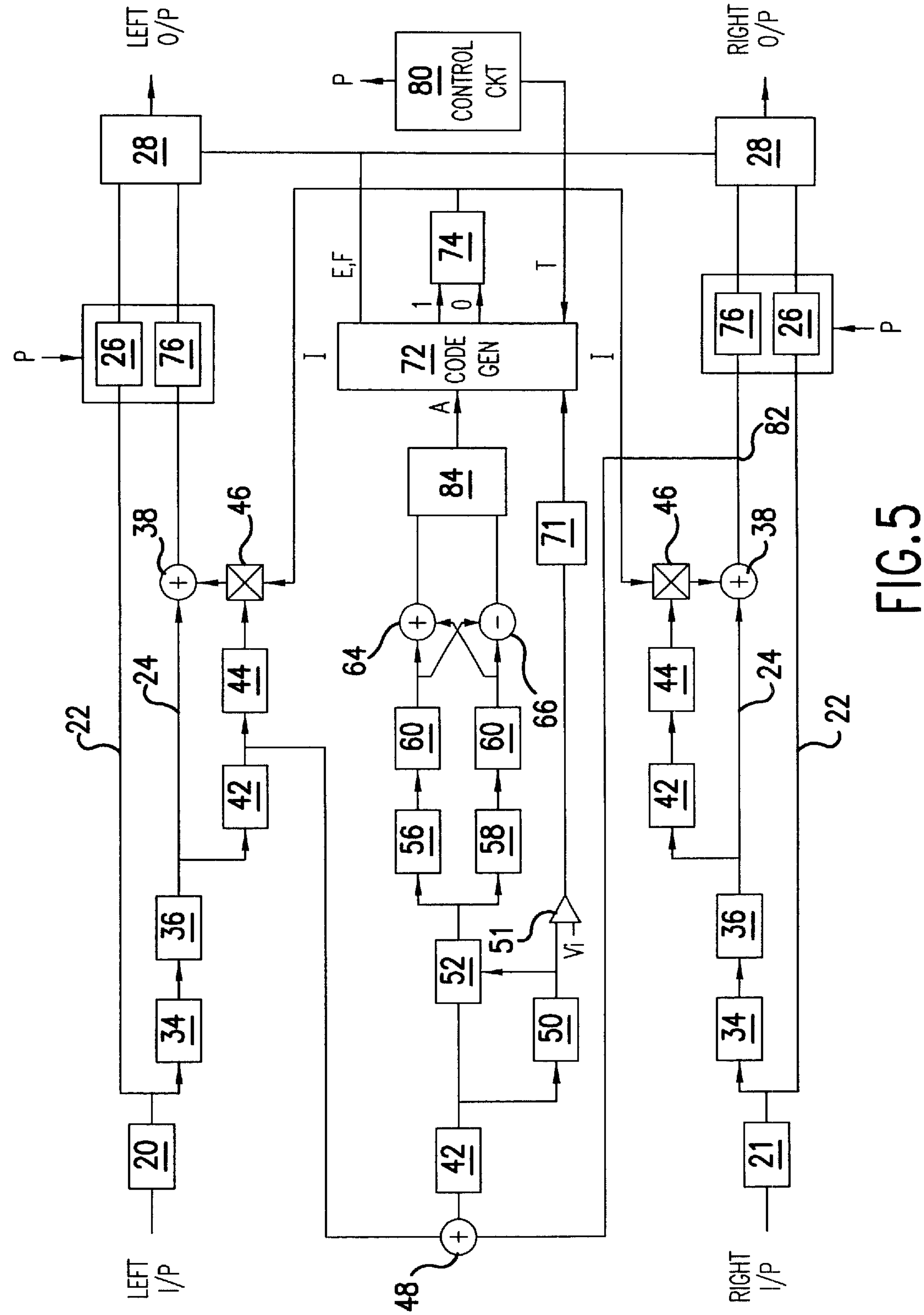
FIG. 5 shows an encoding apparatus forming a second preferred embodiment of the invention.

Referring now to FIG. 5, this shows a second embodiment of encoding apparatus according to the invention, where inserted code is checked as to whether it is recoverable by a decoding process prior to transmission. In FIG. 5, similar reference numerals to those used in FIG. 4 are used for similar parts. In FIG. 5, the encoded signal is fed from a junction 82 in coding path 24, upstream of summer 38, to summer 48. In addition, the insertion signal from comparator 51 is applied direct via a smoothing device 71 to code generator circuit 72. The sum and difference signals from units 64, 66 are applied to a decode circuit 84, which operates on a bit by bit basis to check whether the code has been correctly inserted, and provides an enable signal A to circuit 72.

Thus, in operation, code generator circuit 72 generates code as described above with reference to FIG. 4, but it will not provide enable signals E, F to faders 28 unless code detector circuit 84 performs a satisfactory decode operation, and comparator circuit 51 provides an audio level satisfactory signal.

Figure 6:
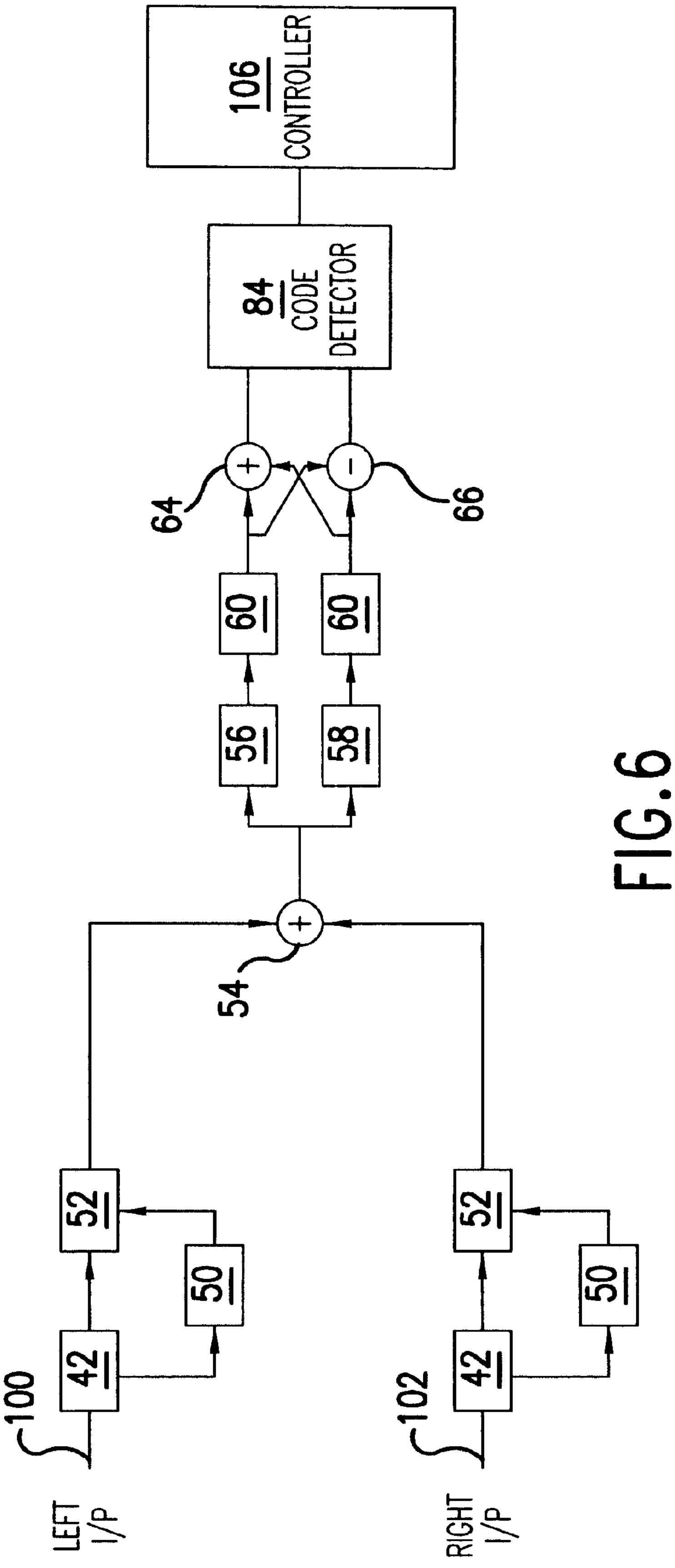
FIG. 6 is a block diagram of decoding apparatus for use with the present invention.

Referring now to FIG. 6, this shows decoding apparatus for decoding an audio signal coded with the circuit of FIG. 4 or 5. Similar parts to those of FIG. 4 and 5 are denoted by the same reference numerals. Stereophonic coded audio signals are fed to the Left and Right inputs 100, 102, and gain controlled versions of these signals are produced by bandpass filters 42, rectifiers, and AGC units 52. The signals are summed as at 54, and band pass filtered versions of the summed signal are added and subtracted as in units 56–66. A code detector unit 84 (as in FIG. 5), under the control of a controller 106, detects the presence of signals from summer 64 (representing synchronizing pulses) and signals from subtractor 66 (representing data pulses).

In the situation where a monophonic signal is to be decoded, or a stereophonic signal converted to mono, then an audio signal will be applied to only one of the inputs 100, 102.

In the prior art, the coded signal comprised a synchronization pulse of duration 8 data bit periods. In the present embodiments this has been replaced by a plurality of short pulses (in the present example 6). Each of these pulses consists of the absence of data in the plurality of wavebands for one period, followed by the presence of pulses in all wavebands of the plurality for a further period of one bit, thus having a total duration of twelve bit periods. The decoding device will only detect the presence of a code if the size and duration of each of these pulses is within predetermined limits. This modification has two advantages. Firstly it is very unlikely that the program material will have this form of time dependence so that false data detection is minimized. Secondly, the presence of several leading and/or trailing edges to the pulses makes accurate synchronization of the expected position of the data pulses easier and thus minimizes crosstalk between successive bits in the following message portion of the code signal. In addition, error detection may be improved by the incorporation of check-bits in the data or message portion of the code signal. In the above examples 5 check bits are used. This can give the advantage that the decoding device does not have to average over several full code durations before producing a valid code word, thereby speeding up the retrieval of the code.

Any convenient form of coding using a plurality of narrow frequency bands may be used as an alternative to the forms described above. In particular, the frequency band may be chosen by "frequency-hopping" in an apparently random manner in an analogous way to that employed in radio communication systems in order to make the recorded signals more difficult to mask.

The position and number of the notch filters used in the invention need not be as described in the above examples. Two or more notch filters may be used. The notch filters need not be the specific filters described, although elliptic filters are preferred. The position, depth and width of the notches inserted by the filters may be chosen within broad ranges. The bandpass or masking filters employed likewise need not be restricted to 1–5 or 1–6 kHz, for example ranges of 2–5 or 2–4 kHz etc. may be employed instead depending upon the position of the notches in the given signal.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Apparatus for labelling a stereophonic audio signal having two channels, comprising:

a plurality of notch filters having selected center frequencies to form notches at such selected frequencies in the channels of the stereophonic audio signal;

code generating means to produce a coded label signal formed as at least one code word, the code being formed of selected signal bursts at the selected frequencies; and insertion means for inserting the coded label signal into both channels of the audio signal in said notches therein, with the code signal amplitude bearing a predetermined relationship to the audio signal amplitude of the respective channel;

wherein the code generating means is arranged to produce code words each including an initial synchronizing portion comprising a series of marks and spaces, each mark comprising a burst of all said selected frequencies.

2. Apparatus for labelling a stereophonic audio signal, comprising:

a plurality of notch filters having selected center frequencies to form respective notches at such selected frequencies in a stereophonic audio signal comprising at least two channels;

code generating means to produce a coded label signal comprising at least one code word, the code being formed of selected bursts of the selected frequencies; and insertion means for inserting at least part of the entire coded label signal simultaneously into both of said at least two channels of the stereophonic audio signal in said notches therein.

3. Apparatus according to claim 2, including for each stereophonic channel, a direct signal path, and a coding signal path including said insertion means, both paths being selectively coupled to output ports via one of switch and fade means.

4. Apparatus according to claim 3, wherein said code generating means is arranged to provide enable signals to said one of switch and fade means.

5. Apparatus according to claim 3, wherein each coding signal path includes:

said notch filters;

means for providing a signal related to the amplitude of an incoming audio signal for controlling in dependence thereon the amplitude of generated code signals; and means for adding the amplitude controlled code signals to the notched audio signals and providing the sum to said one of switch and fade means.

6. Apparatus according to claim 2, wherein the code insertion means includes first check means for checking whether any residual audio signal at the notch frequencies is such as to create a risk of faulty code detection.

7. Apparatus according to claim 6, wherein said first check means includes:

gain control means for providing gain controlled versions of the incoming audio signal;

means for summing the gain controlled signals;

band pass filters corresponding to the inverse of said notch filters coupled to the output of said summing means for providing signals to level checking means;

means for deriving the sum and difference of the outputs of the bandpass filters; and means for comparing such sum and difference signals with threshold values to derive first check signals.

8. Apparatus according to claim 2, including second check means for checking whether the level of the incoming audio signal is sufficient to mask inserted code.

9. Apparatus according to claim 8 wherein said second check means includes:

gain control means for providing gain controlled versions of the incoming audio signal;

means for summing the gain controlled signals; and means for comparing the summed signals with a threshold value to provide a second check signal.

10. Apparatus according to claim 6, wherein one of said first and second check means is arranged to control the generation of code by said code generation means.

11. Apparatus according to claim 2, further comprising decoding means responsive to the audio signal with code inserted therein to perform a decoding operation to assess whether the code is recoverable and, if so, to permit the transmission of the coded audio signal.

12. Apparatus according to claim 2, wherein the code generating means is arranged to produce code words each including an initial synchronizing portion comprising a series of marks and spaces, each mark comprising a burst of all said selected frequencies.

13. A method for labelling a stereophonic audio signal comprising at least two channels, comprising:

forming in the incoming audio signal a plurality of filtered notches at selected frequencies;

generating a coded label signal comprising at least one code word, the code being formed of selected bursts of said selected frequencies; and inserting at least part of the entire coded label signal simultaneously into each channel of the stereophonic audio signal in said notches therein.

* * * * *